United States Patent
Hansl et al.

(10) Patent No.: US 6,824,345 B2
(45) Date of Patent: Nov. 30, 2004

(54) LOAD-BEARING FRAME FOR A SHELF-STACKING DEVICE

(75) Inventors: Rudolf Hansl, Altmünster (AT); Josef Reischl, Wels (AT)

(73) Assignee: TGW Transportgeräte GmbH & Co. KG, Wels (AT)

( * ) Notice: Subject to any disclaimer, the term of this patent is extended or adjusted under 35 U.S.C. 154(b) by 0 days.

(21) Appl. No.: 10/737,218

(22) Filed: Dec. 16, 2003

(65) Prior Publication Data

US 2004/0126210 A1 Jul. 1, 2004

(30) Foreign Application Priority Data

Dec. 18, 2002 (AT) ..................................... A 1893/2002

(51) Int. Cl.[7] .............................. B65G 1/04; B65F 9/07
(52) U.S. Cl. ...................... 414/282; 414/278; 414/279; 198/347.2
(58) Field of Search ................................ 414/278, 279, 414/282; 198/347.1, 347.2

(56) References Cited

U.S. PATENT DOCUMENTS

| | | | | |
|---|---|---|---|---|
| 3,934,741 A | * | 1/1976 | Wentz | 414/663 |
| 4,014,442 A | * | 3/1977 | Adelson et al. | 414/282 |
| 4,229,135 A | * | 10/1980 | Malmros | 414/284 |
| 4,265,582 A | * | 5/1981 | Theobald | 414/279 |
| 5,330,306 A | * | 7/1994 | Pemberton et al. | 414/286 |
| 5,364,220 A | * | 11/1994 | Killinger | 414/272 |
| 5,380,139 A | * | 1/1995 | Pohjonen et al. | 414/280 |
| 5,839,872 A | * | 11/1998 | Goto et al. | 414/280 |
| 6,042,322 A | * | 3/2000 | Piccini | 414/281 |
| 6,149,366 A | * | 11/2000 | Deandrea | 414/279 |
| 6,179,541 B1 | * | 1/2001 | Rioux et al. | 414/282 |
| 6,199,490 B1 | * | 3/2001 | Langer | 108/143 |
| 6,520,312 B2 | * | 2/2003 | Jager | 198/346.1 |

FOREIGN PATENT DOCUMENTS

| | | |
|---|---|---|
| AT | 402065 | 1/1997 |
| DE | 2421396 | 11/1975 |
| DE | 4111523 | 10/1992 |
| DE | 4235576 | 4/1994 |
| DE | 4405952 | 11/1994 |
| DE | 4422240 | 1/1995 |
| DE | 19534291 | 3/1997 |
| DE | 19614660 | 10/1997 |
| DE | 10040492 | 2/2002 |

* cited by examiner

Primary Examiner—Douglas Hess
(74) Attorney, Agent, or Firm—Collard & Roe, P.C.

(57) ABSTRACT

The invention relates to a load-bearing frame (18) for a conveyor device, in particular a shelf-stacking device (1), with a support frame (19) which can be secured on a lift (17) of the conveyor device and, disposed on it, mutually parallel support mechanisms with displaceable telescopic support arms for receiving a storage unit such as a pallet (6), box, etc., and a conveyor system forming a conveying direction extends parallel with a displacement direction of the support mechanisms (21). The conveyor system consists of conveyor mechanisms (27) with two linear conveyors (26) arranged in pairs, disposed symmetrically by reference to a mid-plane (31) and extending between the support mechanisms (21) perpendicular to the standing surface (8) of the shelf-stacking device (1), forming a conveyor direction parallel with a displacement direction of the support mechanisms (21). Mean distances (39, 40) of the linear conveyors (26) extending perpendicular to the mid-plane (31) are greater than a mean distance (41) of the support mechanisms (21).

28 Claims, 6 Drawing Sheets

LOAD-BEARING FRAME FOR A SHELF-STACKING DEVICE

BACKGROUND OF THE INVENTION

1. Field of the Invention

The invention relates to a load-bearing frame for a conveyor device, in particular a shelf stacking device, with a support frame which can be secured to a lift carriage of the conveyor device and, on it, mutually parallel support mechanisms with displaceable telescopic support arms for a storage unit such as a pallet, box, etc., and a conveyor unit running parallel with a displacement mechanism of the support mechanisms constituting a conveyor direction.

2. The Prior Art

Patent specification DE 100 40 492 A1 discloses a telescopic table system on a load-bearing frame of a shelf stacking device for moving pallets, boxes etc. in or out of shelves, which has a frame with a drive unit and an arm comprising several telescopic elements engaging one inside the other which can be displaced on guide rails, thereby enabling a specific range of the arm be obtained in order to stack in at least two stowage spaces disposed one behind the other.

Also known is a loading table of a lift system with telescopically displaceable load-bearing arms, which is additionally provided with a conveyor system in the region between the load-bearing arms, such as a belt conveyor or chain conveyor. This simplifies the manipulation of storage units when transferring them from upstream or downstream incoming and outgoing conveyor systems, such as belt conveyors, roller tracks, etc.

SUMMARY OF THE INVENTION

The objective of the invention is to propose a load-bearing frame, by means of which the running time involved in storing and retrieving items can be reduced.

This objective is achieved by the invention due to the fact that the conveyor system constituting the conveyor unit has two pairs of conveyor mechanisms disposed between the supporting mechanism, which are symmetrically disposed by reference to the mid-plane and extend perpendicular to a standing surface of the shelf stacking device, with a conveyor direction parallel with a displacement direction of the support mechanisms, constituting a linear conveyor, and mean distances of the linear conveyor extending perpendicular to the mid-plane are bigger than a mean distance of the support mechanisms. The surprising advantage of this system is that the storage unit can be transported both longitudinally and transversely and many of the turning mechanisms needed in the receiving and despatching area and the non-productive time incurred by such systems, which would otherwise increase handling times and thus increase warehousing costs, are significantly reduced.

Advantages are also to be had from other embodiments of the load-bearing frame in which load-bearing surfaces of the linear conveyors of the conveyor mechanisms form two parallel conveyor planes at a distance from one another and extend perpendicular to the mid-plane and/or, by reference to a transport plane formed by the load-bearing surface of the conveyor mechanisms, a conveyor plane is formed at a slight distance above the latter whilst the other conveyor plane extends underneath at a distance from it. As result of these embodiments, allowance is made for the different levels of the bottom face by which the storage unit is accommodated, which are determined by the special design of the sub-structure of adjoining storage units depending on the direction in which they are conveyed. The option of being able to convey the storage unit in the direction of longitudinal extension or transversely thereto is made possible by the fact of being able to set the fixed conveyor planes at different levels relative to a transport plane, and whilst maintaining the transport plane—in line with the load-bearing surface of the support mechanisms—the conveyor mechanisms and the load-bearing surfaces afforded by the conveyor mechanisms run at a lower level than the transport plane during longitudinal transport and at a higher level during transverse transport, so that there is no need to make any other height adjustment or time-consuming adjustment of other equipment.

Another embodiment of the load-bearing frame is possible, in which the distance between the conveyor planes corresponds to an internal height of a sub-structure of the storage unit, thereby ensuring an exact adjustment to accommodate the structural features of the sub-structure of the storage unit.

In another advantageous embodiment of the load-bearing frame, a mean distance between the linear conveyors constituting the conveyor plane underneath the transport plane is greater than a mean distance of the support mechanisms but shorter than a mean distance of the linear conveyors constituting the conveyor extending above the transport plane, which means that a universal structure may be used for longitudinal transportation and transverse transportation of the storage unit, dispensing with the need for complex positioning mechanisms to adjust the load-bearing frame.

Another advantage is to be had from an embodiment of the load-bearing frame, in which a support device is provided more or less at the centre between the telescopically adjustable load-bearing arms of the support mechanisms, in the form of a roller track or by means of a belt or chain circulating endlessly about a roller system, etc., because this provides central support for the storage unit.

The load-bearing frame can be made in other advantageous embodiments in which the linear conveyors are provided in the form of traction conveyors and/or by chain or belt conveyors or belt drives running across a length of the support frame, which means that tried and tested systems may be used for transporting and manipulating the storage units on the load-bearing frame.

Also of advantage are embodiments of the load-bearing frame in which the linear conveyors are drivingly linked, either jointly or individually, and/or the support mechanisms are linked to one another and drivingly linked to a drive, in particular an electric drive, which reduces the complexity of the mechanical and control system.

In other embodiments of the load-bearing frame, the conveyor planes are provided with rail-type guide elements disposed across the length of the support frame, extending in a direction perpendicular to the conveyor direction and bounding a conveyor width, and/or guide elements are provided in the form of roller tracks or guide rails and act as lateral guides for the storage unit, thereby ensuring that it is centrally positioned on the load-bearing frame incorporating the conveyor mechanisms, which makes the transport process safe and reliable.

In other advantageous embodiments of the load-bearing frame, the guide elements are adjustably supported on the support frame, enabling the guide elements and the conveyor mechanisms to be exactly adapted.

In another embodiment of the load-bearing frame, the telescopic support arms are made up of multiple telescoping systems and/or an adjustment path of the telescopic support arms corresponds to at least twice the amount of a loading depth of the load-bearing frame on either side of a zero position on the support frame, which means that the storage unit can be stored and retrieved from a racking system of double depth designed to provide economic storage facilities.

In other advantageous embodiments of the load-bearing frame, a length of the linear conveyors more or less corresponds to the loading depth of the load-bearing frame and/or opposite ends of the linear conveyors form inclined receiving and despatching areas adjoining transport elements, enabling the storage unit to be placed on the conveyor mechanisms in the region of the load-bearing frame and continuously transferred from the conveyor mechanisms onto the support mechanisms, which increases conveyance speeds, bringing quite a significant reduction in storage operating times.

Other embodiments of the load-bearing frame have a drive for the linear conveyors and/or a drive for the support mechanisms which is reversible, thereby enabling positioning sequences for the storage unit to be run with minimised cycle times, both in the racking and on the load-bearing frame.

Also of advantage is the load-bearing frame in which the drives for the support mechanisms and the conveyor mechanisms are designed so that they can be activated and powered either individually or jointly as an option, via a control system of the shelf stacking system, making economical use of energy.

In yet other advantageous embodiments, the storage unit can be positioned on the exact centre of the load-bearing frame and accurate positioning of the storage unit is guaranteed, which permits high acceleration values and hence conveying speeds, thereby reducing transfer times and the associated warehousing costs.

Finally, in other embodiments of the load-bearing frame, the support frame is made in a lightweight construction from sheet metal sections and/or from lightweight metal, the advantage of which is that the intrinsic weight of the system is reduced and hence the payload factor, calculated as a ratio of payload to intrinsic weight, which has positive implications in terms of efficient use of energy in operating such systems, which is further enhanced by the shorter transfer times resulting from the fact that the weights which have to be moved are lower.

BRIEF DESCRIPTION OF THE DRAWINGS

In order to provide a clearer understanding, the invention will be described in more detail below with reference to examples of embodiments illustrated in the appended drawings. Of these.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
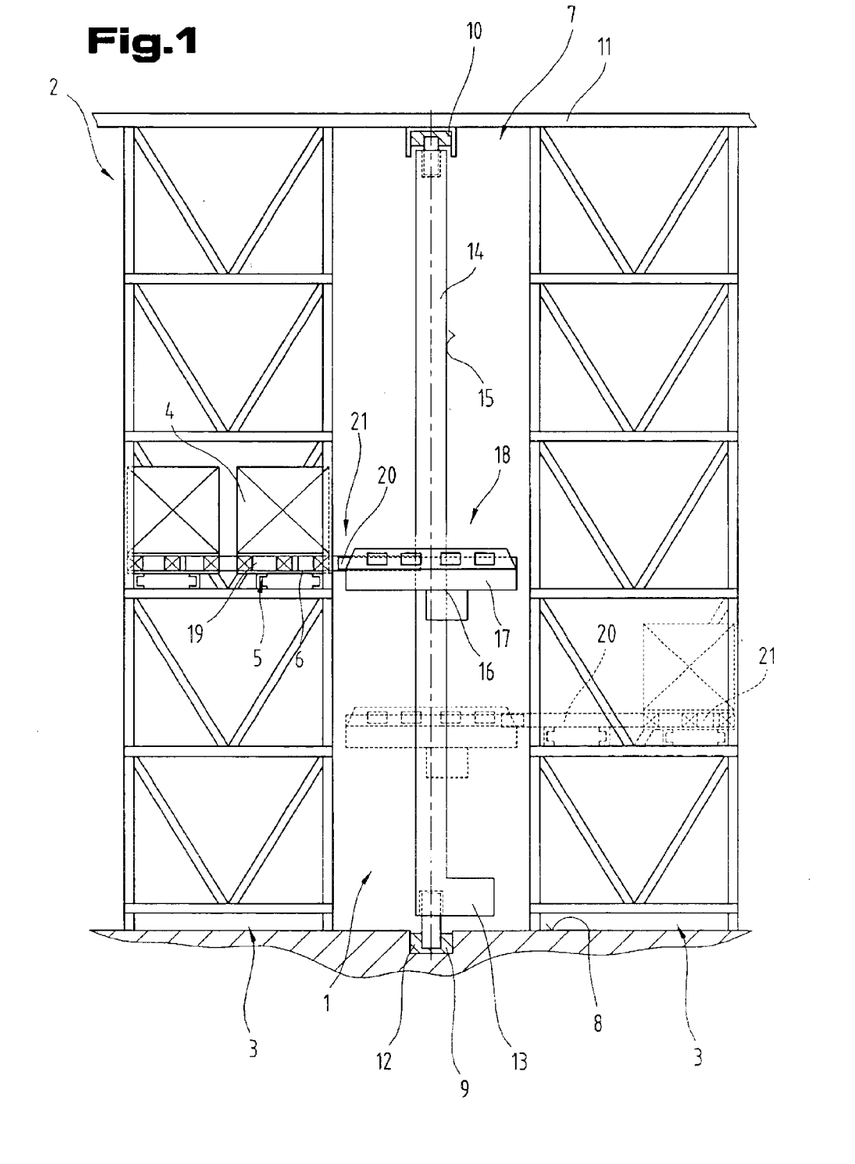
FIG. 1 illustrates a racking system with a shelf-stacking device equipped with the load-bearing frame proposed by the invention.

FIG. 1 illustrates a shelf-stacking device 1 and a racking system 2 based on an example of an upright rack system with shelves 3 for storing goods, commodities 4 on or in storage units 5, e.g. pallets 6, cardboard boxes, crates, etc. The shelf-stacking device 1 illustrated in this example can be moved along a racking aisle 7 in a track 9 running along or in a standing surface 8 and a track 10 on a ceiling 11 of the racking systems 2 with bogie assemblies 12 and a drive 13, which can be displaced on a mast 14 extending perpendicular to the standing surface 8. The latter serves as a guide system 15 for an adjustable lift 17 which can be displaced by means of a drive 16 in the direction perpendicular to the standing surface 8.

The shelf-stacking device 1 may be a single-mast shelf-stacking device of the type disclosed in patent specifications DE 44 05 952 A1, DE 195 34 291 A1, DE 196 14 660 A1 or a dual-mast shelf-stacking device, such as that disclosed in patent specification DE 195 34 291 A1.

A load-bearing frame 18 is provided on the lift 17 of the shelf-stacking device 1. It comprises a support frame 19, preferably made from a system of metal sections so that it has a low intrinsic weight, this support frame 19 being provided with support mechanisms in the form of adjustable telescopic support arms 20 known from the prior art. The support mechanisms 21 with the telescopic support arms 22 preferably operate in a multiple telescoping arrangement, whereby the storage units 5 can be stored and retrieved from a given racking aisle 7 with shelves 3 disposed on one or both sides of the racking aisle 7, such as the double shelving illustrated, and can be so irrespective of whether the pallet 6, indicated in solid lines, is to be stored at or retrieved from a point adjacent to the racking aisle or whether the pallet is one as indicated by broken lines and has to be stored in or retrieved from a point farther away from the racking aisle 7. It should be pointed out that the racking system 2 may also be of a design with individual shelves, although these are not illustrated, in which case the more economic solution will be that of the dual shelves, as in the embodiment illustrated as an example here. The shelf 3 may be used for both longitudinal or transverse storage of the storage unit 5, e.g. the pallets 6, such as pallets conforming to the DIN 15146 or DIN 15156 standards, or crates. Naturally, it would also be possible to handle storage units 5 of different basic shapes.

Figure 2:
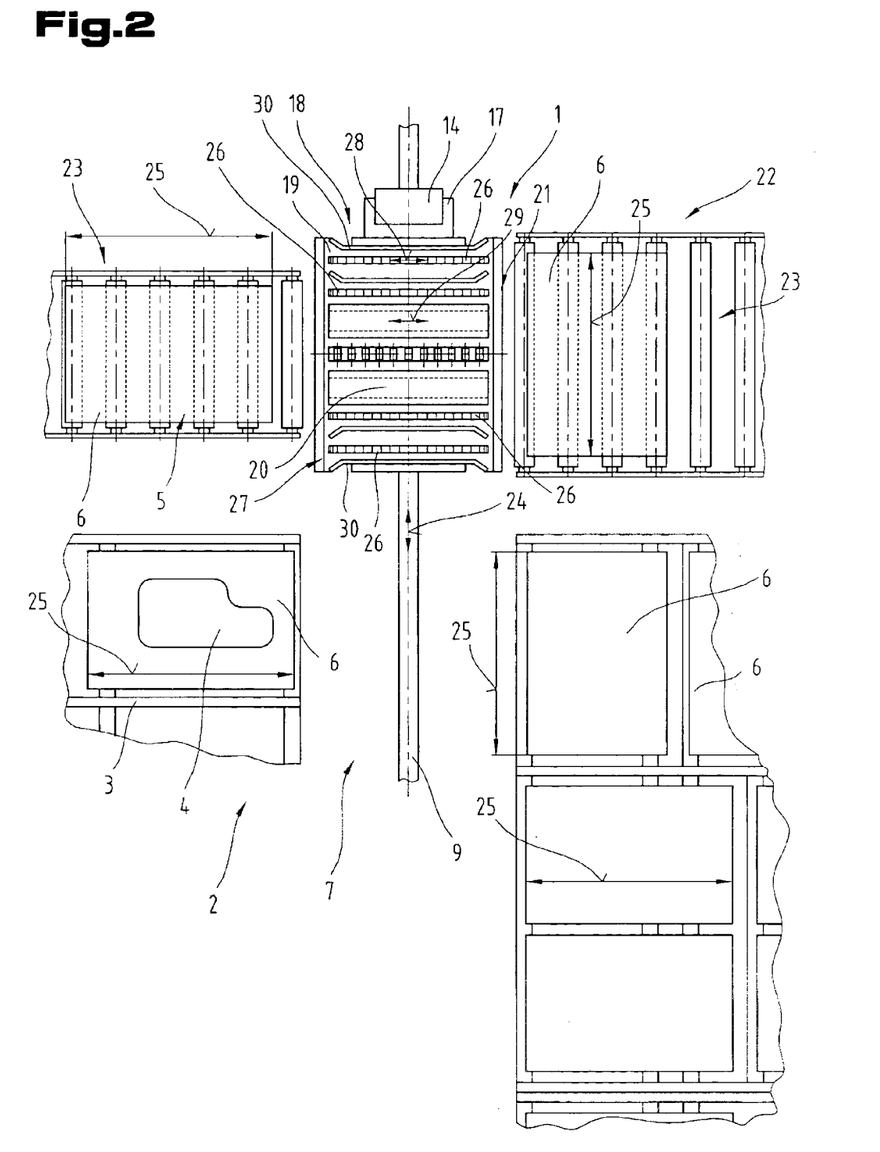
FIG. 2 shows a part-region of the racking system with the incoming and despatch region and the shelf stacking device, with the load-bearing frame proposed by the invention.

FIG. 2 illustrates a part-region of the racking system 2 with the shelf-stacking device 1 and an reception and/or despatch area 23 for the storage unit 5. In the embodiment illustrated here, the incoming and despatch region 22 has roller tracks 23 for receiving or despatching the storage units, by means of which the latter are preferably conveyed in a direction perpendicular to a travel direction—indicated by double arrow 24—of the shelf-stacking device 1. As illustrated, it may be necessary to feed the storage unit 5 alongside the load-bearing frame 18 of the shelf-stacking device 1 transversely to a length 25 or in the direction of the length 25. In either case, it should be possible to effect a transfer from the load-bearing frame 18 without the need for other manipulating mechanisms, such as turning devices or other intervention on the load-bearing frame 18, because all these additional features add to the time involved in storage and retrieval due to unproductive time, thereby increasing transfer coasts and hence warehousing costs.

As may be seen more particularly from FIG. 2, the support frame 10 of the load-bearing frame 18 is disposed on the lift 17 of the shelf-stacking device 1. In addition to the support mechanisms 21 with the telescopic support arms 20 mentioned above, two conveyor mechanisms 27 in the form of linear conveyors 26 disposed in respective pairs are provided on the support frame 19, the conveyor direction—indicated by double arrow 28—of which runs parallel with a displacement direction—indicated by double arrow 29—of the telescopic support arms 20, and parallel rail-type guide elements 30 co-operate with the linear conveyors 26 providing a lateral guiding action for the storage unit 5. A supporting device 32 is also provided on the support frame 19, running along a mid-plane 31 between the telescopic support arms 20, and may be provided in the form of a roller system or an endless circulating belt or chain, for example.

As may also be seen from FIG. 2, the design of the load-bearing frame 18 proposed by the invention, incorporating the support mechanisms 21 and the conveyor mechanisms 27 comprising several linear conveyors 26, offers the possibility of transferring the storage unit 5 onto the load-bearing frame 18 in both the longitudinal or transverse direction, without the need to manipulate it by moving the transport element. The storage unit 5 is transferred to or from the roller tracks 23 in the receiving and despatch area 22 by operating the linear conveyors 26, but without having to operate the support mechanisms 21. This makes for a considerable saving in time when transferring storage units 5 onto the load-bearing frame 18. Naturally, it would be possible to provide sensors for example, in which case the linear conveyors 26 would not be set in motion until the storage unit 5 draws closer to the load-bearing frame 18 on the roller track 23.

The storage units 5 are stored in or retrieved from the shelf 3 with the support mechanisms 21 and the linear conveyors 26 operating simultaneously, thereby achieving high displacement speeds and short turnaround times.

As also illustrated in FIG. 2, if the racking is designed accordingly, the load-bearing frame 18 can be used for a combined storage system for the storage unit, in other words, in the direction of the length 25 or transversely thereto, which simplifies the running of a warehouse operated on the basis of allocating free spaces and further accelerates transfer times.

A preferred embodiment of the load-bearing frame 18 will now be described with reference to FIG. 3. The load-bearing frame 18 is basically designed to have a low inherent weight in order to optimise the ratio of payload to intrinsic weight and achieve a factor of between 1.5 and 3. This will minimise energy consumption for operating the shelf-stacking device and permit higher acceleration, ultimately permitting a high-speed transfer of the storage unit 5.

To this end, the support frame 19 of the load-bearing frame 18 is made from sections of sheet metal with a view to producing a lightweight structure and even more weight can be saved by using section lengths with bores and standard joint connections of a minimum weight, depending on the load-bearing capacities needed. The support frame 19 is preferably a welded structure of metal, light alloy, etc.

Disposed on the support frame 19 are the two parallel, mutually spaced support mechanisms 21 disposed parallel with the mid-plane and incorporating the telescopic support arms 28, which telescope in a plurality of arrangements in a known manner to obtain the appropriate ranges. The support mechanisms 21 and the telescopic support arms 20 are driven by a common drive 33, in particular by electric motor. Naturally, the drive 33 is reversible and if designed accordingly, the support mechanisms 21 can be extracted at both ends. A load bearing surface 34 of the telescopic support arms 20 for supporting the storage units 5 will be referred to as transport plane 35 in order to elaborate on the definition and operation of the conveyor mechanism 27. The support mechanism 32, which is provided in the form of a roller track 36, is provided between the telescopic support arms 20 and parallel with them in a mid-plane 31 disposed perpendicular to the transport plane 35. Instead of the roller track 36, it would also be possible to use other solutions to provide a support mechanism 32 of this type, such as an endless chain or belt circulating on rollers, although a drive need not necessarily be provided for the supporting mechanism 32.

Disposed more or symmetrically relative to the mid-plane 31 and extending parallel therewith and on either side of it are two of the linear conveyors 26, the pairs each forming pairs of conveyor planes 37, 38 by reference to the mid-plane 31 which are on a different level from the transport plane 35. The mean distances 39, 40 extending perpendicular to the mid-plane 31 are greater than a mean distance 41 of the support mechanisms 21 and differ in terms of their dimensions. The conveyor plane 38 formed by the linear conveyors 26 arranged closer to the support mechanisms 21 sits below the transport plane 35 by a distance 42 in the direction of the support frame 19, whilst the conveyor plane 37 formed by the linear conveyors 26 farther way extend at a slight distance 43 above the transport plane 35. A distance 44 constituting the distances 42, 43 perpendicular to the transport plane 35 between the conveyor planes 37 therefore corresponds to an internal clearance height of a pallet base frame or a footprint of a stacking container, crate or similar storage unit.

Figure 3:
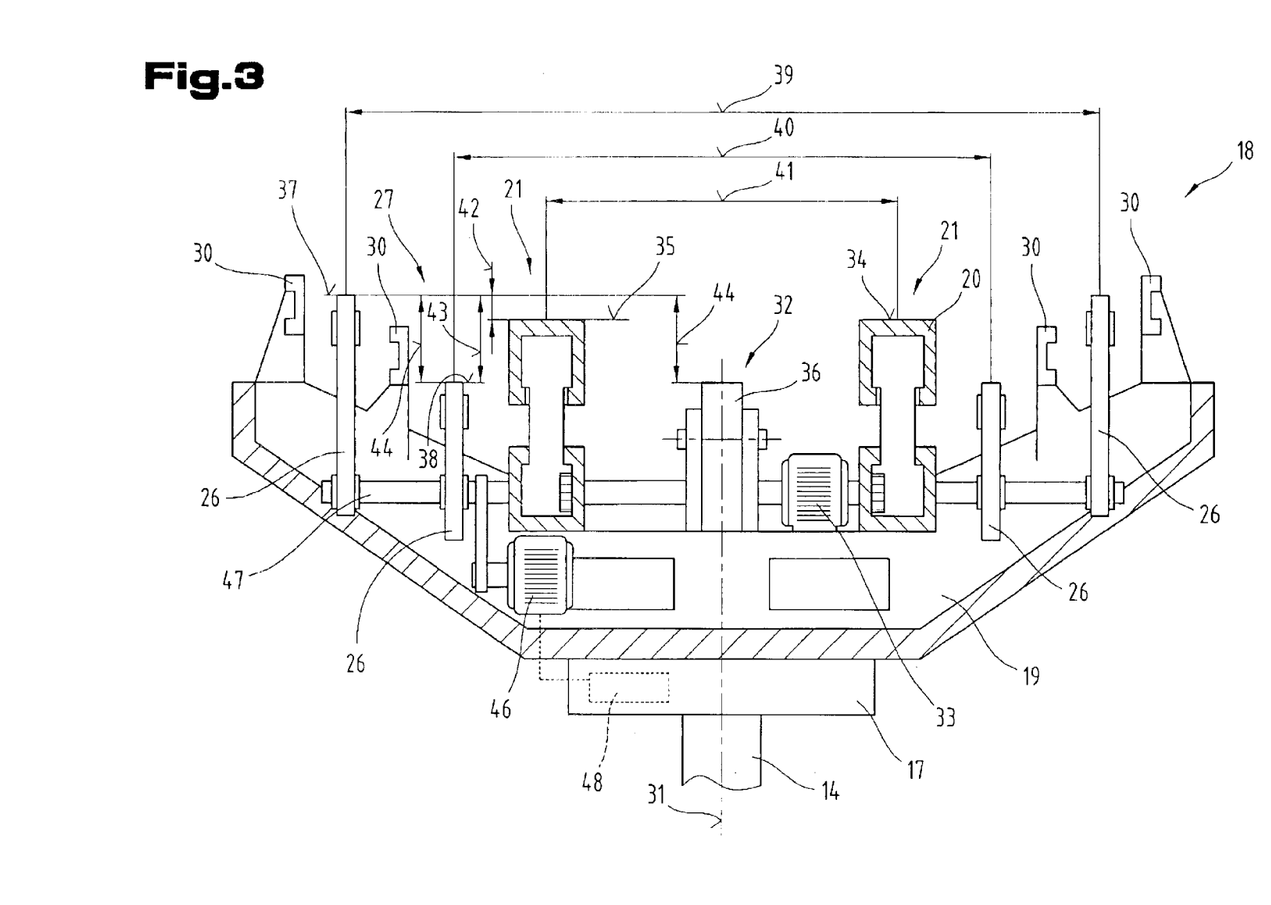
FIG. 3 is a simplified, schematic diagram of the load-bearing frame in cross section.

As may also be seen from FIG. 3, the parallel rail-type guide elements cooperate with the linear conveyors 26 along the conveyor plane 37, 38 and form a lateral boundary for the conveyor planes 37, 38, which are adapted to the length 5 or a width 45 of the storage unit 5 to be conveyed.

A common drive 46 is provided for the conveyor mechanisms 27 comprising the linear conveyors 26, preferably an electric motor-operated drive, with a reversible drive direction. To this end, the electric motor in the form of a drive 46 is provided in the support frame 19 and is drivingly linked to a drive train 47 of shafts, articulated shafts, etc., linking the linear conveyors 26. This design guarantees synchronous, simultaneous operation of all four linear conveyors 26. Depending on what transport sequence is being performed, the drive 33 of the support mechanisms 21 or the drive 46 of the conveyor mechanisms 27 or the drives 33, 46 together are activated by a control system 48 of the shelf-stacking device 1, in order to operate the load-bearing frame 18 in accordance with the respective transport sequence, as will be described in more detail below.

Naturally, it would also be possible to provide a common drive 46 for each conveying direction 27, i.e. for each pair of linear conveyors 26, or alternatively it would also be perfectly possible to provide each linear conveyor with its own separate drive 46, all of these layouts constituting other embodiments of the invention.

Figure 4:
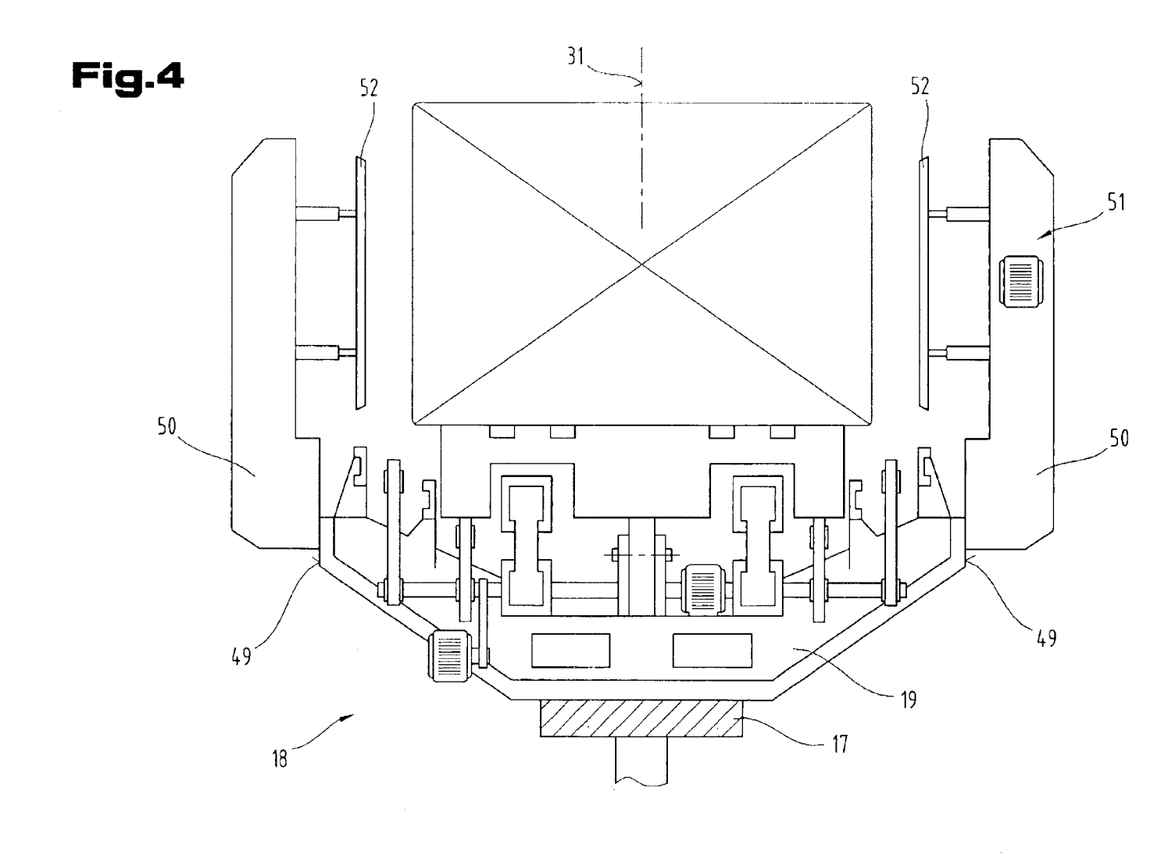
FIG. 4 shows another embodiment of the load-bearing frame proposed by the invention.

FIG. 4 shows a simplified, schematic diagram of another embodiment of the load-bearing frame 18. In this instance, support brackets 50 are provided on the support frame 19 on opposite side walls 49 extending parallel with the conveying direction 49, which project above the transport plane 35 as well as above the conveyor planes 37, 38, in each of which preferably plate-shaped positioning and/or retaining means, displaceable in the direction perpendicular to the mid-plane 31, are guided by means of a drive mechanism 51. Consequently, the storage units can be positioned on the load-bearing frame 18 and hence by reference to the support mechanisms 21 and conveyor mechanism 27, and held in position whilst the shelf-stacking device 1 and the lift 17 are moving, it also being possible to operate the storage and retrieval procedures at higher speeds, thereby significantly reducing the turnaround time.

A whole range of possibilities known from the prior art may be used for the drive mechanism 51 as well as for a guide system between the positioning and/or retaining means 52 and the support brackets 50. For example, it would be possible to mount the displaceable positioning and retaining means 42 on the support brackets 50 by means of a pivoting lever arrangement and provide the drive mechanism 51 as a crank drive operated by electric motor. Naturally, various other technical designs would also be conceivable.

Figure 5:
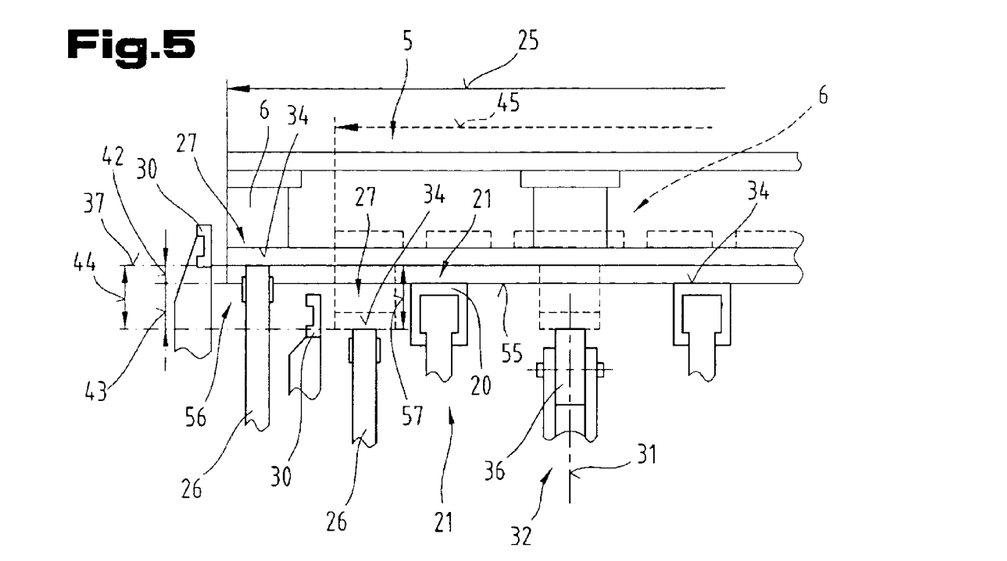
FIG. 5 is a schematic diagram of the load-bearing frame, depicting the options for transporting a pallet-storage unit.
Figure 6:
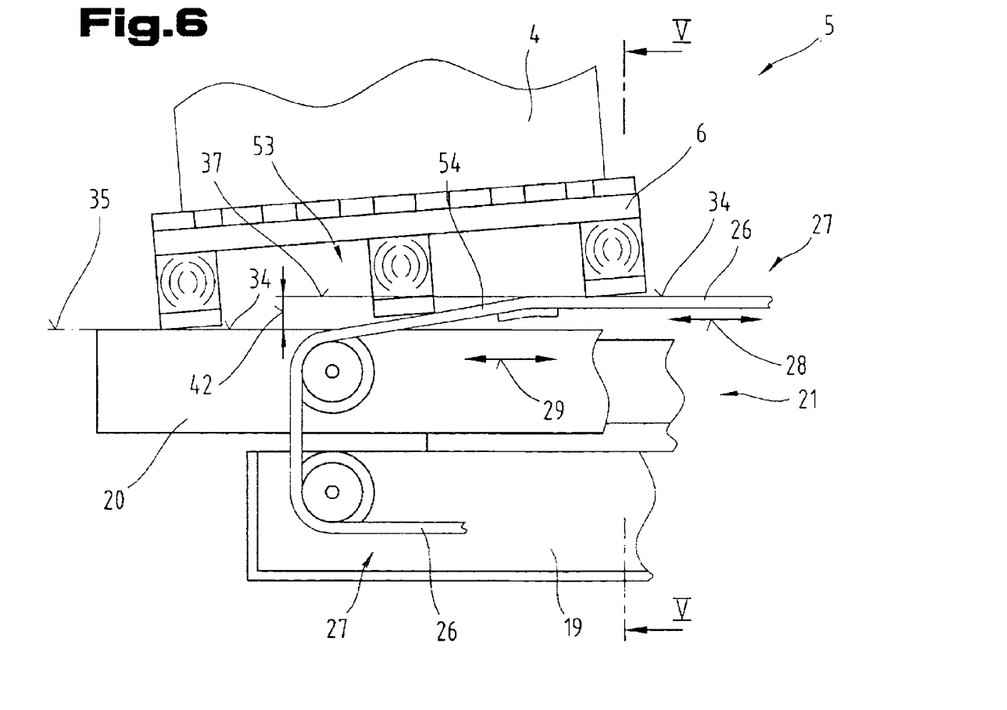
FIG. 6 is a schematic diagram showing an end region of the load-bearing frame.

FIGS. 5 and 6 illustrate the process by which the storage unit 5, in particular a pallet 6, is transported, the situation illustrated being equally applicable to both storage in and retrieval from a racking system 2 by reversing the displacement direction of the telescopic load-bearing arms 21—indicated by double arrow 29—and the linear conveyors 26—indicated by double arrow 28. In the embodiment illustrated as an example here, the pallet 6 shown in solid lines illustrates transverse conveyance, in other words conveyance in the direction extending transversely to the length 25, whilst the pallet 6 indicated by broken lines will be transferred to and from the telescopic support arms 20 in the longitudinal direction. Both when transporting the pallet away from the region of the load-bearing frame 18 and when placing the pallet 6 in the region of the load-bearing frame 18, the telescopic support arms 20 of the support mechanisms 21 and linear conveyors 26 of the conveyor mechanisms 27 are simultaneously displaced in synchronisation. In the region of the load-bearing frame 18, the pallet 6 is placed on the load bearing surface 34 of the linear conveyors 26, which support the conveyor plane 37 and conveyor plane 38 at a different level from the load bearing surface 34 of the telescopic support arms 20, as described above.

In one end region 53, a transport element 54 extends at an incline towards the load bearing surface 34 so that as the pallet 6 is transported along, the respective bottom face 55 by which it will be placed on the load bearing surface 34 is lowered following the alignment of the pallet 6. A higher feed rate can be achieved due to the combination of the forward feed of the linear conveyors 26 and the load-bearing support arms 20, which again significantly reduces turnaround time or running time.

In terms of control options, it would naturally also be possible for drives 33 and 46 to be synchronised with one another so that the conveyor mechanisms 27 are not switched on until the pallet 6 is received on the load-bearing frame 18, once the pallet 6 along with the telescopic load-bearing arms 20 has reached the area of the linear conveyors 26. Conversely, if moving the pallets out from the area of the load-bearing frame 18, the drive 46 of the linear conveyors 26 will then be stopped once the entire pallet 6 is received on the load bearing surface 34 of the telescopic support arms 20. This will make operation of the shelf-stacking devices 1 even more efficient in terms of power consumption.

In view of the fact that a sub-structure 56 of the pallets 6 and also the bottom faces 55 of many other storage units 5, such as boxes for example, run on different levels before being transferred onto the load bearing surface 34 depending on whether they are being conveyed in the longitudinal direction or transversely thereto, there is a distance 44 between the conveyor planes 37, 38 which corresponds to an internal height 57 of the sub-structure 56 of the storage unit 5.

Figure 7:
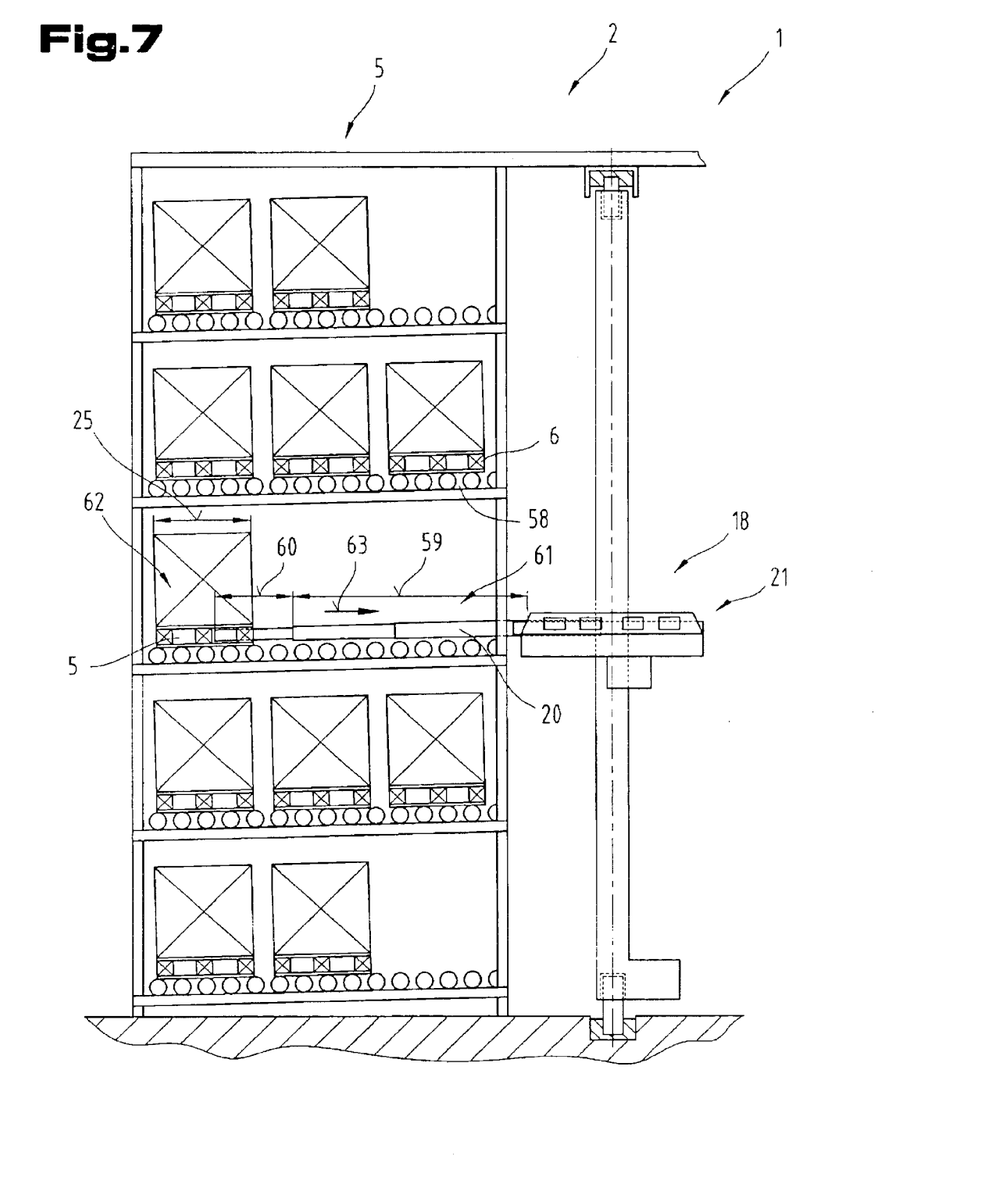
FIG. 7 is another embodiment of the load-bearing frame proposed by the invention for repeatedly depositing and retrieving items in and from a racking system.

FIG. 7 illustrates another embodiment of the load-bearing frame 18 of the shelf-stacking device 1. The racking system 2 in this case has so-called gravity roller tracks 58 to accommodate the storage unit 5, e.g. pallets 6. This racking system 2 is designed for holding three of the storage units 5 stowed one behind the other, irrespective of whether they are stowed in the longitudinal or transverse direction.

To this end, the load-bearing frame 18 has the support mechanisms 21 in the form of the telescopic support arms 20, which are designed so that they can be extracted by an extraction distance 59 which additionally projects beyond the displacement path 60 in order to operate double storage.

The storage units 5 are stored simply by extracting the telescopic support arms 20 on the obliquely extending gravity roller tracks 58 towards the stowage space 61 adjacent to the shelf-stacking device 1, from where they will roll off due to force of gravity into a stowage space 62 farther away.

In order to remove the storage unit 5 from this more remote storage space 62, the telescopic load-bearing arms 20 of the support mechanisms 21 are extracted by the extraction distance 59 and additionally by the other displacement path 60, which is ¼ of the length 25 of the pallets 6, for example. As the telescopic support arms 20 are raised, a friction lock is established with the pallet 6 as the telescopic load-bearing arms 20 are retracted—arrow 63—so that it is supported on the gravity roller track 58 and pulled in the direction towards a stowage space, e.g. stowage space 61, closer to the shelf-stacking device 1. From there, the load-bearing frame 18 can then proceed with the standard retrieval process by rapidly adjusting the telescopic support arms 20.

It should be pointed out that a design of this type may be used to operate in shelves disposed on both sides of a racking aisle.

For the sake of good order, it should finally be pointed out that in order to provide a clearer understanding of the structure of the load-bearing means, it and its constituent parts are illustrated to a certain extent out of scale and/or on an enlarged scale and/or on a reduced scale.

The underlying objective and the independent solutions proposed by the invention may be found in the description.

Above all, the embodiments of the subject matter illustrated in FIGS. 1; 2; 3; 4; 5, 6; 7 may be construed as independent solutions proposed by the invention in their own right. The associated objectives and solutions proposed by the invention may be found in the detailed descriptions of these drawings.

List of reference numbers
1 Shelf-stacking device
2 Racking system
3 Shelf
4 Goods
5 Storage unit
6 Pallet
7 Racking aisle
8 Standing surface
9 Track
10 Track
11 Ceiling
12 Running gear
13 Drive
14 Mast
15 Guide system
16 Drive
17 Lift
18 Load-bearing frame
19 Support frame
20 Telescopic support arm
21 Support mechanism
22 Receiving and despatch area
23 Roller track
24 Double arrow
25 Length
26 Linear conveyor
27 Conveying direction
28 Double arrow
29 Double arrow
30 Guide element
31 Mid-plane
32 Support mechanism
33 Drive
34 Load bearing surface
35 Transport plane
36 Roller track
37 Conveyor plane
38 Conveyor plane
39 Mean distance
40 Mean distance
41 Mean distance
42 Distance
43 Distance
44 Distance
45 Width
46 Drive
47 Drive train
48 Control system
49 Side wall
50 Support bracket
51 Drive mechanism
52 Positioning and/or retaining means
53 End region
54 Transport element
55 Bottom face
56 Sub-structure
57 Height
58 Gravity roller track
59 Extraction distance
60 Displacement path
61 Stowage space
62 Stowage space
63 Arrow

What is claimed is:

1. Load-bearing frame for a conveyor device, in in the form a shelf-stacking device, with a support frame which can be secured on a lift of the conveyor device and, disposed on it, mutually parallel support mechanisms with displaceable telescopic support arms for receiving a storage unit such as a pallet or box etc., and a conveyor system forming a conveying direction extending parallel with a displacement direction of the support mechanisms, characterised in that the conveyor system consists of conveyor mechanisms with two linear conveyors arranged in pairs, disposed symmetrically by reference to a mid-plane and extending between the support mechanisms perpendicular to the standing surface of the shelf-stacking device, forming a conveyor direction parallel with a displacement direction of the support mechanisms, and mean distances of the linear conveyors extending perpendicular to the mid-plane are greater than a mean distance of the support mechanisms.

2. Load-bearing frame as claimed in claim 1, characterised in that load-bearing surfaces of the linear conveyors of the conveyor mechanisms form two mutually parallel conveyor planes at a distance apart from one another extending perpendicular to the mid-plane.

3. Load-bearing frame as claimed in claim 2, characterised in that, by reference to a transport plane formed by the load-bearing surface of the support mechanisms, a conveyor plane is at a slight distance above the latter and the other conveyor plane extends at a distance underneath it.

4. Load-bearing frame as claimed in claim 2, characterised in that the distance between the conveyor planes corresponds to an internal height of a sub-structure of the storage unit.

5. Load-bearing frame as claimed in claim 2, characterised in that a mean distance between the linear conveyors forming the conveyor plane below the transport plane is greater than a mean distance of the support mechanisms but shorter than a mean distance of the linear conveyors forming the conveyor plane extending above the transport plane.

6. Load-bearing frame as claimed in claim 2, characterised in that rail-type guide elements are provided along the length of the support frame bounding the conveyor planes in a conveyor width extending in a direction perpendicular to the conveying direction.

7. Load-bearing frame as claimed in claim 6, characterised in that the guide elements are provided in the form of roller tracks or by guide rails.

8. Load-bearing frame as claim 6, characterised in that the guide elements are displaceably supported on the support frame.

9. Load-bearing frame as claimed in claim 1, characterised in that a support mechanism in the form of a roller track or an endless belt or chain circulated on a roller system is provided more or less in the middle between the telescopically adjustable load-bearing arms of the support mechanisms.

10. Load-bearing frame as claimed in claim 1, characterised in that the linear conveyors are provided in the form of traction conveyors extending along a length of the support frame.

11. Load-bearing frame as claimed in claim 1, characterised in that the linear conveyors are provided in the form of chain or belt conveyors or belt drives.

12. Load-bearing frame as claimed in claim 1, characterised in that the linear conveyors are drivingly linked, jointly or individually to one another and to a drive, in particular an electric drive.

13. Load-bearing frame as claimed in claim 1, characterised in that the support mechanisms are drivingly linked to one another and to a drive, in particular an electric drive.

14. Load-bearing frame as claimed in claim 1, characterised in that the telescopic support arms are designed with multiple telescoping systems.

15. Load-bearing frame as claimed in claim 1, characterised in that a displacement path of the telescopic support arms corresponds to at least twice the amount of a loading depth of the load-bearing frame on either side of a zero position on the support frame.

16. Load-bearing frame as claimed in claim 1, characterised in that a length of the linear conveyors approximately corresponds to a loading depth of the load-bearing frame.

17. Load-bearing frame as claimed in claim 1, characterised in that the linear conveyors form inclined receiving and dispatching areas at opposite end regions adjoining transport elements.

18. Load-bearing frame as claimed in claim 1, characterised in that a drive for the linear conveyors is reversible.

19. Load-bearing frame as claimed in claim 1, characterised in that a drive for the support mechanisms is reversible.

20. Load-bearing frame as claimed in claim 1, characterised in that drives for the support mechanisms and the conveyor mechanisms may optionally be individually or jointly activated and supplied with energy via a control system of the shelf-stacking device.

21. Load-bearing frame as claimed in claim 1, characterised in that support brackets projecting above the transport plane are provided on the support frame, on side walls extending parallel with the conveying direction.

22. Load-bearing frame as claimed in claim 21, characterised in that positioning and/or retaining means are provided on the support brackets bounding the two sides of a conveyor width and are displaceable in a direction extending perpendicular to the conveying direction by means of a drive mechanism.

23. Load-bearing frame as claimed in claim 22, characterised in that the positioning and/or retaining means are mounted on the support brackets by means of guide systems.

24. Load-bearing frame as claimed in claim 23, characterised in that the guide system is a pivoting lever system.

25. Load-bearing frame as claimed in claim 23, characterised in that the positioning and/or retaining means are displaceable by means of a crank drive which can be motor-operated.

26. Load-bearing frame as claimed in claim 25, characterised in that the crank drive and the drive mechanism are supported on the support brackets by means of overload-safety means.

27. Load-bearing frame as claimed in claim 1, characterised in that the support frame is made in a lightweight structure from sheet-metal sections.

28. Load-bearing frame as claimed in claim 1, characterised in that the support frame is made from lightweight metal.

* * * * *